US011651298B2

(12) United States Patent
Andersson

(10) Patent No.: US 11,651,298 B2
(45) Date of Patent: May 16, 2023

(54) PARKING SYSTEM AND METHOD

(71) Applicant: Ningbo Geely Automobile Research & Development Co., Ltd., Ningbo (CN)

(72) Inventor: William Andersson, Vimmerby (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/080,582

(22) Filed: Oct. 26, 2020

(65) Prior Publication Data

US 2021/0056471 A1 Feb. 25, 2021

Related U.S. Application Data

(63) Continuation of application No. PCT/CN2019/083876, filed on Apr. 23, 2019.

(30) Foreign Application Priority Data

May 8, 2018 (EP) ..................................... 18171335

(51) Int. Cl.
*G06Q 10/02* (2012.01)
*G06Q 30/02* (2012.01)
(Continued)

(52) U.S. Cl.
CPC ............. *G06Q 10/02* (2013.01); *B60K 35/00* (2013.01); *G06Q 10/06315* (2013.01);
(Continued)

(58) Field of Classification Search
CPC ............. G06Q 10/02; G06Q 10/06315; G06Q 30/0284; G06Q 2240/00; G07B 15/02; G08G 1/143
(Continued)

(56) References Cited

U.S. PATENT DOCUMENTS

2008/0114675 A1 5/2008 Ward
2012/0095790 A1* 4/2012 Stefik ..................... G06Q 10/00
705/5
(Continued)

FOREIGN PATENT DOCUMENTS

CN 105261232 A 1/2016
CN 106297384 A 1/2017
(Continued)

OTHER PUBLICATIONS

ParkMobile; "ParkMobile Extends Mobile Parking Payment Solution in Montgomery County"; Nov. 15, 2017. (Year: 2017).*
(Continued)

*Primary Examiner* — Resha Desai
*Assistant Examiner* — Dione N. Simpson
(74) *Attorney, Agent, or Firm* — Tucker Ellis LLP

(57) ABSTRACT

A system and a method for simplifying payment of a vehicle parking fee for a user. The method includes detecting, by a sensor, that a vehicle is parked; determining a geographical vehicle position data of the parked vehicle; sending the parking request message to the vehicle parking management server from a communication device; determining, by the vehicle parking management server, at least a first vehicle parking fee service provider among plural of available vehicle parking fee service providers that is available for receiving payment of the vehicle parking fee where the vehicle is parked; displaying, via a user interface of the communication device, selection information associated with the a least first vehicle parking fee service provider available for receiving payment of the vehicle parking fee where the vehicle is parked.

20 Claims, 4 Drawing Sheets

(51) Int. Cl.
*B60K 35/00* (2006.01)
*G06Q 10/0631* (2023.01)
*G06Q 30/0283* (2023.01)
*G07B 15/02* (2011.01)
*G08G 1/14* (2006.01)
*H04L 67/12* (2022.01)
*G06F 16/955* (2019.01)
*F16H 59/08* (2006.01)
*G01S 19/52* (2010.01)
*G06F 3/14* (2006.01)

(52) U.S. Cl.
CPC ......... *G06Q 30/0284* (2013.01); *G07B 15/02* (2013.01); *G08G 1/143* (2013.01); *H04L 67/12* (2013.01); *B60K 2370/16* (2019.05); *F16H 59/08* (2013.01); *F16H 2312/12* (2013.01); *G01S 19/52* (2013.01); *G06F 3/14* (2013.01); *G06F 16/955* (2019.01); *G06Q 2240/00* (2013.01)

(58) Field of Classification Search
USPC .......................................................... 705/5
See application file for complete search history.

(56) References Cited

U.S. PATENT DOCUMENTS

| | | |
|---|---|---|
| 2014/0266801 A1 | 9/2014 | Uppal |
| 2014/0350855 A1 | 11/2014 | Vishnuvajhala |
| 2015/0015709 A1* | 1/2015 | Stefan ............... G08G 1/09626 348/148 |
| 2015/0170518 A1* | 6/2015 | Rodriguez Garza .. G08G 1/144 340/932.2 |
| 2015/0179070 A1 | 6/2015 | Sandbrook |
| 2016/0019789 A1* | 1/2016 | Park ....................... G08G 1/143 340/932.2 |
| 2016/0117866 A1 | 4/2016 | Stancato et al. |
| 2016/0133134 A1* | 5/2016 | Todasco ................ G07B 15/02 705/13 |
| 2016/0140774 A1 | 5/2016 | Weinberger |
| 2017/0032584 A1* | 2/2017 | Moran .................... H04W 4/00 |
| 2018/0225650 A1* | 8/2018 | Vossoughi ............. G08G 1/148 |
| 2020/0042805 A1* | 2/2020 | Satomi .................. G06V 20/56 |

FOREIGN PATENT DOCUMENTS

| | | |
|---|---|---|
| CN | 106327598 A | 1/2017 |
| CN | 206003165 U | 3/2017 |
| CN | 107464299 A | 12/2017 |
| CN | 107730621 A | 2/2018 |
| FR | 2830963 A1 | 4/2003 |
| GB | 2540413 A | 1/2017 |
| GB | 201512487 A | 1/2017 |
| WO | 0215130 A1 | 2/2002 |
| WO | 03034347 A1 | 4/2003 |

OTHER PUBLICATIONS

International Search Report from corresponding International Application No. PCT/CN2019/083876, dated Jul. 5, 2019, 2 pages.

* cited by examiner

A

S9a
Receiving selection input by a user, via the user interface (400a, 400b) of the communication device, wherein the selection input selecting the at least first vehicle parking fee service provider available for receiving payment of the vehicle parking fee where the vehicle is parked

S9b
Receiving selection input by a user, via the user interface (400a, 400b) of the communication device, wherein the selection input selecting one of the first vehicle parking fee service provider or the second vehicle parking fee service provider available for receiving payment of the vehicle parking fee where the vehicle is parked

S10
Displaying, via a user interface (400a, 400b) of the communication device, instructions to the user how to make payment of the vehicle parking fee to the selected vehicle parking fee service provider

Fig. 3B

PARKING SYSTEM AND METHOD

RELATED APPLICATION DATA

This application is a continuation of International Patent Application No. PCT/CN2019/083876, filed Apr. 23, 2019, which claims the benefit of European Patent Application No. 18171335.5, filed May 8, 2018, the disclosures of which are incorporated herein by reference in their entireties.

TECHNICAL FIELD

The disclosure pertains to the field of systems and methods for payment of parking fees.

BACKGROUND

Traditionally, parking payment has generally been performed via a parking meter that is close to a vehicle parking. The parking fee has either paid by cash or credit card and a printed paper ticket confirming the parking fee has been placed in the front window of a vehicle, visible for inspection. Today it is however becoming more and more common to use a portable electronic device, such as a smartphone, for paying a parking fee. The portable electronic device has a software that runs a parking payment application. The parking payment application is typically designed by a particular vehicle parking fee service provider that offers parking at certain locations. A user of the vehicle parking fee service provider typically needs to register personal information together with vehicle information and payment information. There are vehicle parking fee service providers that offer payment via the parking payment application e.g. with knowledge of a certain payment information such as credit card information, or e.g. that the vehicle parking fee service provider sends an invoice to the user by the end of the Month. It is common that plural vehicle parking fee service providers offer payment of a parking fee for the same location. A user typically have plural parking payment applications installed on the smartphone in order to pay a parking fee where the user normally uses the vehicle. If the vehicle is used in plural geographical locations, it is often needed to have a number of different parking payment applications installed for each vehicle parking fee service provider. When a user is visiting a new city, state or country etc., the user very often needs to install, parking payment applications and sign up or a new each vehicle parking fee service provider. It is also not always possible to know what vehicle parking fee service provider that are available at a certain location. Often a user of a vehicle needs to leave the vehicle and search for any written information about parking in the vicinity of the parking area.

SUMMARY

Today there is a demand for a better solution that enhances the experience of paying parking fees. Current solutions with plural parking payment applications for different vehicle parking fee service providers is cumbersome for the user to handle, and more and more parking payment applications for different vehicle parking fee service providers are needed. Each vehicle parking fee service provider has their own payment solution. The vehicle user also needs search for information about any available vehicle parking fee service provider at a certain location. In particular at new locations the user of the vehicle e.g. needs to leave the vehicle and search for written information in the area where the user wants to park the vehicle.

The disclosure proposes a method for simplifying payment of a vehicle parking fee for a user. The method comprising the step of detecting, by a sensor, that a vehicle is parked and the step of determining a geographical vehicle position data of the parked vehicle. The method further comprising the step of generating a parking request message to a vehicle parking management server wherein the parking request message comprising the geographical vehicle position data and the step of sending the parking request message to the vehicle parking management server from a communication device. The method further comprising the step of receiving the parking request message at the vehicle parking management server and the step of determining, by the vehicle parking management server, at least a first vehicle parking fee service provider among plural of available vehicle parking fee service providers that is available for receiving payment of the vehicle parking fee where the vehicle is parked. The method further comprising the step of sending a parking response message to the communication device comprising data associated with the a least first vehicle parking fee service provider and the step of displaying, via a user interface of the communication device, selection information associated with the a least first vehicle parking fee service provider available for receiving payment of the vehicle parking fee where the vehicle is parked. The method is then followed by the step of receiving selection input by a user, via the user interface of the communication device, wherein the selection input selecting the at least first vehicle parking fee service provider available for receiving payment of the vehicle parking fee where the vehicle is parked.

An advantage with the method is that a user of the vehicle automatically gets information about how payment for the parking, where the vehicle has been parked, can be initiated without need for using any certain parking payment application, and by a user selection, the parking is initiated using one of plural vehicle parking fee service providers that is available for receiving payment of the vehicle parking fee where the vehicle is parked.

According to an aspect, the method further comprising the step of sending a parking response message to the communication device comprising data associated with a first vehicle parking fee service provider and a second vehicle parking fee service provider. The method is then followed by the step of displaying, via a user interface of the communication device, selection information associated with the first vehicle parking fee service provider and selection information associated with the second vehicle parking fee service provider available for receiving payment of the vehicle parking fee where the vehicle is parked. Then the method is followed by the step of receiving selection input by a user, via the user interface of the communication device, wherein the selection input selecting one of the first vehicle parking fee service provider or the second vehicle parking fee service provider available for receiving payment of the vehicle parking fee where the vehicle is parked. An advantage with the method is that a user of the vehicle automatically gets information about how payment for the parking, where the vehicle has been parked, can be initiated without need for using any certain parking payment application, and by a user selection, that is selecting one of two available options, the parking is initiated using one of plural vehicle parking fee service providers that is available for receiving payment of the vehicle parking fee where the vehicle is parked.

According to an aspect, the method further comprising the step of displaying, via a user interface of the communication device, instructions to the user how to make payment of the vehicle parking fee to the selected vehicle parking fee service provider. An advantage is that the user may be able to control how payment of the vehicle parking fee is carried out, e.g. if plural options exists or if a new payment method needs to be added etc.

According to an aspect the sensor is a gearbox indicator sensor for sensing if the gear shift lever is in parking (P) position. In other words, the information from the gearbox indicator sensor assists in determining that the vehicle has been parked, for initiating parking.

According to an aspect the sensor is a parking sensor for sensing if the vehicle is in a parking space. In other words, the information from the parking sensor assists in determining that the vehicle has been parked, for initiating parking. According to an aspect the sensor is a parking space detection system for sensing if the vehicle is in a parking space. In other words, the information from the parking space detection system assists in determining that the vehicle has been parked, for initiating parking. According to an aspect the sensor is a camera for sensing if the vehicle is in a parking space. According to an aspect the sensor is a fish eye camera for sensing if the vehicle is in or close to a parking space at any side of the vehicle. In other words, the information from the camera assists in determining that the vehicle has been parked, for initiating parking.

According to an aspect the sensor is a global positioning system receiver for sensing if the vehicle going from a driving state to a non-movement state. This means that with knowledge from the relative position data, it can be determined that the vehicle has been parked.

According to an aspect the determining, by the vehicle parking management server, at least a first vehicle parking fee service provider, further comprising sending, from the vehicle parking management server to plural vehicle parking fee service providers, an availability request message comprising the geographical vehicle position data and receiving, at the vehicle parking management server from plural vehicle parking fee service providers, an availability response message indicating the availability of receiving payment of the vehicle parking fee where the vehicle is parked. An advantage is that any vehicle parking fee service provider can act as a third party to the vehicle parking management server that is managing the parking for the vehicle. According to an aspect the communication between any vehicle parking fee service provider and the vehicle parking management server is defined in an application programming interface.

According to an aspect the parking request message further comprising identification data comprising any of an identification data of the vehicle or an identification data of the user of the vehicle. An advantage with this is that the vehicle parking fee service providers can at an early stage know if the user or vehicle is a known user of vehicle e.g. associated with an existing user account or vehicle account.

According to an aspect the communication device is a communication device installed in the vehicle and/or a communication device associated with the user of the vehicle. In other words the communication device has a connection to the vehicle, either direct or via a user of the vehicle.

According to an aspect the parking response message to the communication device comprising data that is any of a web address; a pointer to a software application; a login information; a pre-configured input information or a request to run a software application. An advantage with this is that the processing circuitry of the communication device can prepare an operation based on the content of the parking response message.

The disclosure further proposes a vehicle parking management system for simplifying payment of a vehicle parking fee for a user. The vehicle parking management system comprising a vehicle parking management server, a sensor for sensing that a vehicle is parked, a communication device for communicating with the vehicle parking management server and a processing circuitry. The processing circuitry is configured to cause the vehicle parking management system to detect, by a sensor, that a vehicle is parked and determine a geographical vehicle position data of the parked vehicle. The processing circuitry is further configured to cause the vehicle parking management system to generate a parking request message to a vehicle parking management server wherein the parking request message comprising the geographical vehicle position data and send the parking request message to the vehicle parking management server from a communication device.

The processing circuitry is further configured to cause the vehicle parking management system to receive the parking request message at the vehicle parking management server and determine, by the vehicle parking management server, at least a first vehicle parking fee service provider among plural of available vehicle parking fee service providers that is available for receiving payment of the vehicle parking fee where the vehicle is parked and send a parking response message to the communication device comprising data associated with the a least first vehicle parking fee service provider. The processing circuitry is further configured to cause the vehicle parking management system to display, via a user interface of the communication device, selection information associated with the a least first vehicle parking fee service provider available for receiving payment of the vehicle parking fee where the vehicle is parked and receive selection input by a user, via the user interface of the communication device, wherein the selection input selecting the at least first vehicle parking fee service provider available for receiving payment of the vehicle parking fee where the vehicle is parked. An advantage with the vehicle parking management system is that a user of a vehicle automatically gets information about how payment for the parking, where the vehicle has been parked, can be initiated without need for using any certain parking payment application, and by a user selection, the parking is initiated using one of plural vehicle parking fee service providers that is available for receiving payment of the vehicle parking fee where the vehicle is parked.

According to an aspect the processing circuitry is further configured to cause the vehicle parking management system to send a parking response message to the communication device comprising data associated with a first vehicle parking fee service provider and a second vehicle parking fee service provider and display, via a user interface of the communication device, selection information associated with the first vehicle parking fee service provider and selection information associated with the second vehicle parking fee service provider available for receiving payment of the vehicle parking fee where the vehicle is parked. The processing circuitry is further configured to cause the vehicle parking management system to receive selection input by a user, via the user interface of the communication device, wherein the selection input selecting one of the first vehicle parking fee service provider or the second vehicle parking fee service provider available for receiving payment of the vehicle parking fee where the vehicle is parked. An advantage with the vehicle parking management system is that a user of the vehicle automatically gets information about how payment for the parking, where the vehicle has been parked, can be initiated without need for using any certain parking payment application, and by a user selection, that is selecting one of two available options, the parking is initiated using one of the at least two parking fee service providers that is available for receiving payment of the vehicle parking fee where the vehicle is parked.

According to an aspect the sensor is a gearbox indicator sensor for sensing if the gear shift lever is in parking (P) position. In other words, the information from the gearbox indicator sensor assists in determining that the vehicle has been parked, for initiating parking.

According to an aspect the sensor is a parking sensor for sensing if the vehicle is in a parking space.

According to an aspect the sensor is a parking sensor for sensing if the vehicle is in a parking space. In other words, the information from the parking sensor assists in determining that the vehicle has been parked, for initiating parking. According to an aspect the sensor is a parking space detection system for sensing if the vehicle is in a parking space. In other words, the information from the parking space detection system assists in determining that the vehicle has been parked, for initiating parking. According to an aspect the sensor is a camera for sensing if the vehicle is in a parking space. According to an aspect the sensor is a fish eye camera for sensing if the vehicle is in or close to a parking space at any side of the vehicle. In other words, the information from the camera assists in determining that the vehicle has been parked, for initiating parking.

According to an aspect the sensor is a global positioning system receiver for sensing if the vehicle going from a driving state to a non-movement state. This means that with knowledge from the relative position data, it can be determined that the vehicle has been parked.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 3A and FIG. 3B illustrates a flow chart of the method steps according to the disclosure.

DETAILED DESCRIPTION

Figure 1:
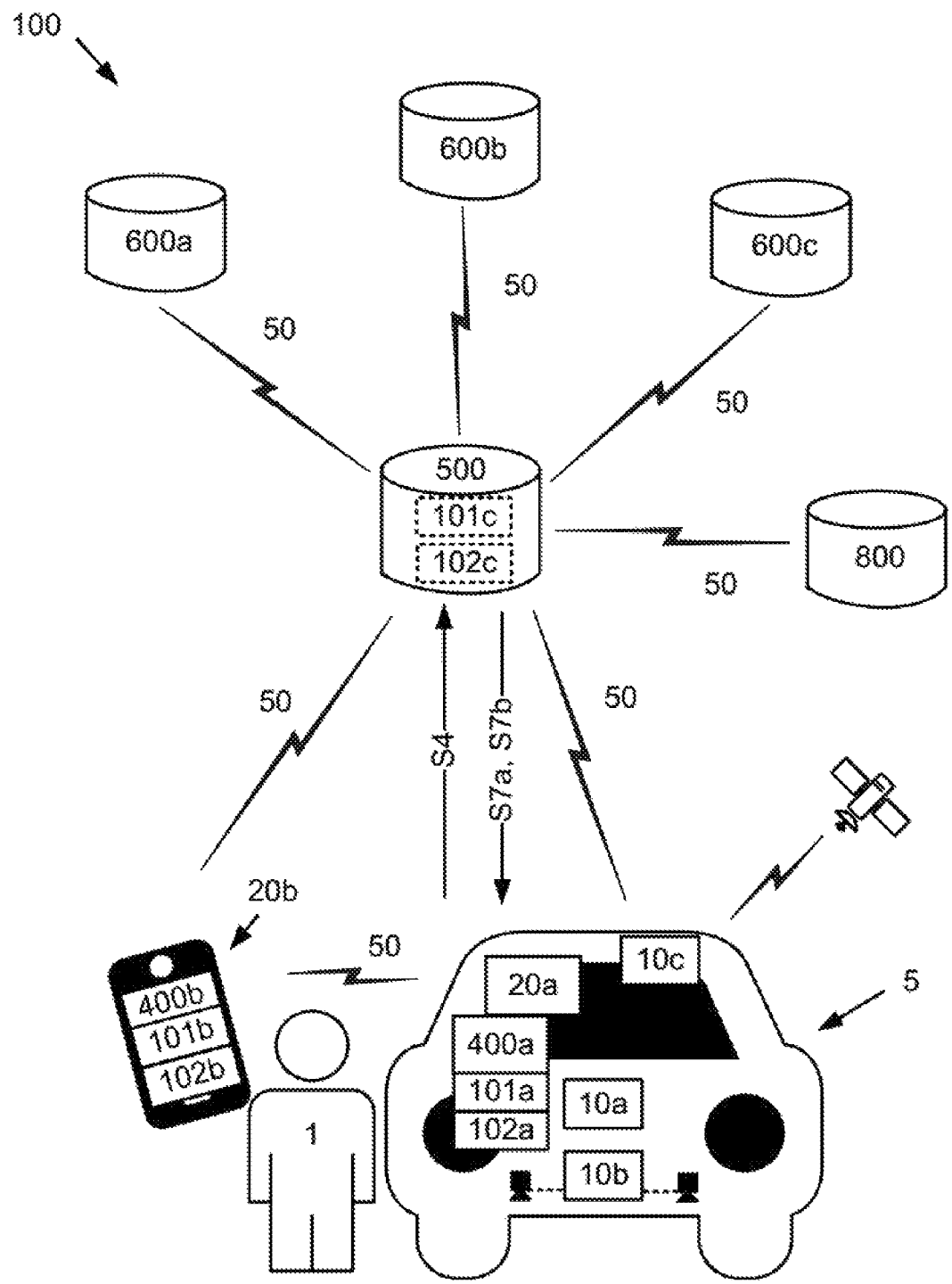
FIG. 1 illustrates an example overview of the proposed vehicle parking management system.

Aspects of the present disclosure will be described more fully hereinafter with reference to the accompanying drawings. The method and system disclosed herein can, however, be realized in many different forms and should not be construed as being limited to the aspects set forth herein. Like numbers in the drawings refer to like elements throughout. The terminology used herein is for the purpose of describing particular aspects of the disclosure only, and is not intended to limit the disclosure.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Today there is a demand for a better solution that enhances the experience of paying parking fees. Current solutions with plural parking payment applications for different vehicle parking fee service providers is cumbersome for the user to handle, and more and more parking payment applications for different vehicle parking fee service providers are needed. Each vehicle parking fee service provider has their own payment solution. The vehicle user also needs search for information about any available vehicle parking fee service provider at a certain location. In particular at new locations the user of the vehicle e.g. needs to leave the vehicle and search for written information in the area where the user wants to park the vehicle.

The disclosure proposes a vehicle parking management system (100) for simplifying payment of a vehicle parking fee for a user. FIG. 1 illustrates an example overview of the proposed vehicle parking management system 100.

The vehicle parking management system 100 comprising a vehicle parking management server 500. According to an aspect the vehicle parking management server 500 is connected to plural vehicle parking fee service providers 600*a*, 600*b*, 600*c* via a communication network 50. According to an aspect the vehicle parking management server 500 is wirelessly connected to a communication device 20*a*, 20*b* via the communication network 50. In one example the communication network 50 is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. In one example the communication network 50 is a standardized wireless local area network such as a Wireless Local Area Network, WLAN, Bluetooth™, ZigBee, Ultra-Wideband, Near Field Communication, NFC, Radio Frequency Identification, RFID, or similar network. The communication network 50 can also be a combination of both a local area network and a wide area network. The communication network 50 between the vehicle parking management server 500 and the plural vehicle parking fee service providers 600a, 600b, 600c can also be wired networks. According to an aspect of the disclosure the communication network 50 is defined by common Internet Protocols.

The vehicle parking fee service provider 600a, 600b, 600c is typically a third party that is offering payment of a parking fee at a certain parking space. The vehicle parking fee service provider 600a, 600b, 600c is managing data regarding parking space information like geographical data, parking fees and payment methods etc. Payment of the parking fee at a certain parking space or geographical location can be offered by plural vehicle parking fee service providers 600a, 600b, 600c.

The vehicle parking management server 500 is typically hosted and managed by a separate entity. In one example the vehicle parking management server 500 is hosted and managed by a vehicle manufacturer.

The vehicle parking management system 100 further comprising a communication device 20a, 20b. According to an aspect the communication device 20a is a vehicle infotainment system of the vehicle 5, as illustrated in FIG. 1. According to an aspect the communication device is a portable electronic device 20b, as illustrated in FIG. 1. The vehicle infotainment system can also be referred to the on-board computer system.

According to an aspect the the communication device is a portable electronic device 20b that is connected to the vehicle infotainment system of the vehicle 5 via a wireless local area network. According to an aspect the the communication device is a portable electronic device 20b in form of a smartphone or tablet.

According to an aspect the communication device 20a, 20b further comprising a user interface 400a, 400b. According to an aspect the user interface 400a, 400b is configured for output of information to a use of the vehicle. According to an aspect the user interface 400a, 400b is configured for input of information from a user of the vehicle. According to an aspect the user interface 400a, 400b is any of a touch sensitive display, a display combined with a keyboard or a voice controlled user interface.

The vehicle parking management system 100 comprising a processing circuitry 102a, 102b, 102c. According to an aspect the processing circuitry 102a, 102b, 102c is implemented in at least one of the vehicle parking management server 500 or in the communication device 20a, 20b, or in the vehicle infotainment system of the vehicle 5.

The vehicle parking management system 100 comprise comprise a memory 101a, 101b, 101c configured to store information. According to an aspect the memory 101a, 101b, 101c is implemented in at least one of the vehicle parking management server 500 or in the communication device 20a, 20b, or in the vehicle infotainment system of the vehicle 5.

According to an aspect the vehicle parking management system 100 comprise a memory 101c and processing circuitry 102c that are implemented in the vehicle parking management server 500 as illustrated in FIG. 1. According to an aspect the vehicle parking management system 100 comprise a memory 101a and processing circuitry 102a that are implemented in the vehicle infotainment system of the vehicle 5 as illustrated in FIG. 1. According to an aspect the vehicle parking management system 100 comprise a memory 101a and processing circuitry 102a that are in the communication device 20a, as illustrated in FIG. 1. According to an aspect the vehicle parking management system 100 comprise a memory 101b and processing circuitry 102b that are implemented in the communication device 20b, as illustrated in FIG. 1.

According to an aspect the vehicle parking management system 100 comprising a communication device 20a, 20b for communicating with the vehicle parking management server 500 and the processing circuitry 102a, 102b, 102c.

The vehicle parking management system 100 further comprising a sensor 10a, 10b, 10c for sensing that a vehicle 5 is parked.

According to an aspect the sensor 10a is a gearbox indicator sensor for sensing if the gear shift lever is in parking (P) position. In other words, the information from the gearbox indicator sensor assists in determining that the vehicle has been parked, for initiating parking.

According to an aspect the sensor 10b is a parking sensor for sensing if the vehicle is in a parking space. In other words, the information from the parking sensor assists in determining that the vehicle has been parked, for initiating parking. According to an aspect the sensor 10b is a parking space detection system for sensing if the vehicle is in a parking space. In other words, the information from the parking space detection system assists in determining that the vehicle has been parked, for initiating parking. According to an aspect the sensor 10b is a camera for sensing if the vehicle is in a parking space. According to an aspect the sensor 10b is a fish eye camera for sensing if the vehicle is in or close to a parking space at any side of the vehicle. In other words, the information from the camera assists in determining that the vehicle has been parked, for initiating parking.

According to an aspect the sensor 10c is a global positioning system receiver for sensing if the vehicle going from a driving state to a non-movement state. In one example the sensing if the vehicle going from a driving state to a non-movement state is provided by a third party application such as "Google maps" that is integrated with the vehicle parking management system 100. This means that with knowledge from the relative position data, it can be determined that the vehicle has been parked.

The processing circuitry 102a, 102b, 102c, 102b is configured to cause the vehicle parking management system 100 to detect, by a sensor 10a, 10b, 10c, that a vehicle 5 is parked and determine a geographical vehicle position data of the parked vehicle 5. The processing circuitry 102a, 102b, 102c is further configured to cause the vehicle parking management system 100 to generate a parking request message to a vehicle parking management server 500 wherein the parking request message comprising the geographical vehicle position data and send the parking request message to the vehicle parking management server 500 from a communication device 20a, 20b. The processing circuitry 102a, 102b, 102c is further configured to cause the vehicle parking management system 100 to receive the parking request message at the vehicle parking management server 500 and determine, by the vehicle parking management server 500, at least a first vehicle parking fee service provider among plural of available vehicle parking fee service providers 600a, 600b, 600c that is available for receiving payment of the vehicle parking fee where the vehicle is parked and send a parking response message to the communication device 20a, 20b comprising data associated with the a least first vehicle parking fee service provider 600a, 600b, 600c. The processing circuitry 102a, 102b, 102c is further configured to cause the vehicle parking management system 100 to display, via a user interface 400a, 400b of the communication device, selection information associated with the a least first vehicle parking fee service provider 600a, 600b, 600c available for receiving payment of the vehicle parking fee where the vehicle is parked and receive selection input by a user, via the user interface 400a, 400b of the communication device, wherein the selection input selecting the at least first vehicle parking fee service provider available for receiving payment of the vehicle parking fee where the vehicle is parked. An advantage with the vehicle parking management system 100 is that a user of a vehicle automatically gets information about how payment for the parking, where the vehicle has been parked, can be initiated without need for using any certain parking payment application, and by a user selection, the parking is initiated using one of plural vehicle parking fee service providers 600a, 600b, 600c that is available for receiving payment of the vehicle parking fee where the vehicle is parked.

According to an aspect the processing circuitry 102a, 102b, 102c is further configured to cause the vehicle parking management system 100 to send a parking response message to the communication device 20a, 20b comprising data associated with a first vehicle parking fee service provider 600a and a second vehicle parking fee service provider 600b and display, via a user interface 400a, 400b of the communication device, selection information associated with the first vehicle parking fee service provider and selection information associated with the second vehicle parking fee service provider available for receiving payment of the vehicle parking fee where the vehicle is parked. The processing circuitry 102a, 102b, 102c is further configured to cause the vehicle parking management system 100 to receive selection input by a user, via the user interface 400a, 400b of the communication device, wherein the selection input selecting one of the first vehicle parking fee service provider or the second vehicle parking fee service provider available for receiving payment of the vehicle parking fee where the vehicle is parked. An advantage with the vehicle parking management system 100 is that a user of the vehicle automatically gets information about how payment for the parking, where the vehicle has been parked, can be initiated without need for using any certain parking payment application, and by a user selection, that is selecting one of two available options, the parking is initiated using one of the at least two parking fee service providers 600a, 600b, 600c that is available for receiving payment of the vehicle parking fee where the vehicle is parked.

The vehicle parking management system 100 illustrated in FIG. 1 is configured to carry out the method and the aspects of the method that will now be described in more detail with reference to FIG. 2, FIG. 3A and FIG. 3B.

Figure 3A:
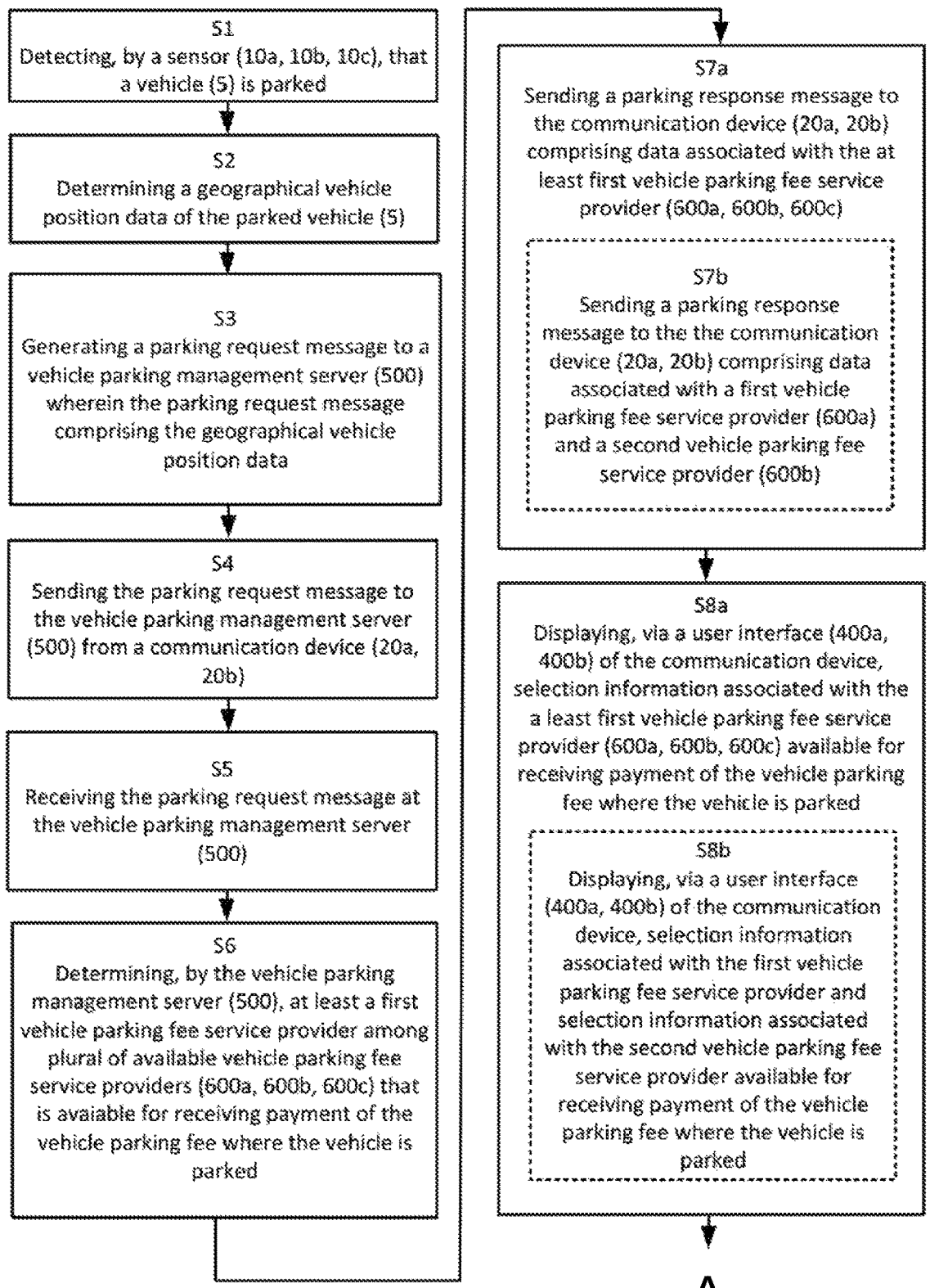

As illustrated in FIG. 3A and FIG. 3B the disclosure proposes a method for simplifying payment of a vehicle parking fee for a user.

With reference to FIG. 3A, the method comprising the step S1 of detecting, by a sensor 10a, 10b, 10c, that a vehicle 5 is parked and the step S2 of determining a geographical vehicle position data of the parked vehicle 5.

According to an aspect the sensor 10a is a gearbox indicator sensor for sensing if the gear shift lever is in parking (P) position. In other words, the information from the gearbox indicator sensor assists in determining that the vehicle has been parked, for initiating parking.

According to an aspect the sensor 10b is a parking sensor for sensing if the vehicle is in a parking space. In other words, the information from the parking sensor assists in determining that the vehicle has been parked, for initiating parking. According to an aspect the sensor 10b is a parking space detection system for sensing if the vehicle is in a parking space. In other words, the information from the parking space detection system assists in determining that the vehicle has been parked, for initiating parking. According to an aspect the sensor 10b is a camera for sensing if the vehicle is in a parking space. According to an aspect the sensor 10b is a fish eye camera for sensing if the vehicle is in or close to a parking space at any side of the vehicle. In other words, the information from the camera assists in determining that the vehicle has been parked, for initiating parking. According to an aspect the sensor is any sensor used for identifying if the vehicle is in a parking space or parked along a road where parking is allowed.

According to an aspect the sensor 10c is a global positioning system receiver for sensing if the vehicle going from a driving state to a non-movement state. This means that with knowledge from the relative position data, it can be determined that the vehicle has been parked.

According to an aspect in the step S2 of determining a geographical vehicle position data of the parked vehicle 5, positioning data is obtained from a global positioning system receiver installed in or on the vehicle 5. According to an aspect in the step S2 of determining a geographical vehicle position data of the parked vehicle 5, positioning data is obtained from the communication device 20a, 20b. According to an aspect in the step S2 of determining a geographical vehicle position data of the parked vehicle 5, positioning data is obtained via a Radio Frequency Identification receiver that is configured to detect positioning data from a Radio Frequency Identification tag installed in the vicinity where the vehicle 5 is parked. According to an aspect in the step S2 of determining a geographical vehicle position data of the parked vehicle 5, positioning data is obtained by receiving a manual input of positioning data by a user via a user interface of the communication device 20a, 20b. In one example a map where the vehicle is parked is displayed to the user of the vehicle via a user interface 400a, 400b and the user is prompted to confirm the location of the vehicle.

With reference to FIG. 3A, the method further comprising the step S3 of generating a parking request message to a vehicle parking management server 500 wherein the parking request message comprising the geographical vehicle position data. According to an aspect the parking request message is a data packet that is sent over the communication network 50 defined by common Internet Protocols.

The method further comprising the step S4 of sending the parking request message to the vehicle parking management server 500 from a communication device 20a, 20b. The method further comprising the step S5 of receiving the parking request message at the vehicle parking management server 500 and the step S6 of determining, by the vehicle parking management server 500, at least a first vehicle parking fee service provider among plural of available vehicle parking fee service providers 600a, 600b, 600c that is available for receiving payment of the vehicle parking fee where the vehicle is parked. According to an aspect the geographical vehicle position data obtained from the parking request message at the vehicle parking management server 500 is used for determining at least a first vehicle parking fee service provider among plural of available vehicle parking fee service providers 600a, 600b, 600c that is available for receiving payment of the vehicle parking fee where the vehicle is parked.

According to an aspect the vehicle position data is compared with position data of the available vehicle parking fee service providers 600a, 600b, 600c. According to an aspect the available vehicle parking fee service providers 600a, 600b, 600c provide so called geo-fenced areas, i.e. areas that define the geographical coverage where the vehicle parking fee service provider 600a, 600b, 600c is offering service for receiving payment of a parking fee. According to an aspect the information of where each vehicle parking fee service provider 600a, 600b, 600c is available for receiving payment of the vehicle parking fee is stored in a memory 101c of the vehicle parking management server 500.

According to an aspect the determining, by the vehicle parking management server 500, at least a first vehicle parking fee service provider, further comprising sending, from the vehicle parking management server 500 to plural vehicle parking fee service providers 600a, 600b, 600c, an availability request message comprising the geographical vehicle position data and receiving, at the vehicle parking management server 500 from plural vehicle parking fee service providers 600a, 600b, 600c, an availability response message indicating the availability of receiving payment of the vehicle parking fee where the vehicle 5 is parked. An advantage is that any vehicle parking fee service provider 600a, 600b, 600c can act as a third party to the vehicle parking management server 500 that is managing the parking for the vehicle. According to an aspect the communication between any vehicle parking fee service provider 600a, 600b, 600c and the vehicle parking management server 500 is defined in an application programming interface.

According to an aspect the determining, by the vehicle parking management server 500, at least a first vehicle parking fee service provider comprising comparing the geographical vehicle position data with the geographical coverage data indicating the availability of receiving payment of the vehicle parking fee by each of the plural vehicle parking fee service providers 600a, 600b, 600c. According to an aspect the processing circuitry 102c, of the vehicle parking management server 500, is configured to determine, at least a first vehicle parking fee service provider among plural of available vehicle parking fee service providers 600a, 600b, 600c that is available for receiving payment of the vehicle parking fee where the vehicle is parked.

The method further comprising the step S7a of sending a parking response message to the communication device 20a, 20b comprising data associated with the a least first vehicle parking fee service provider 600a, 600b, 600c. According to an aspect the parking response message to the communication device 20a, 20b comprising data that is any of a web address; a pointer to a software application; a login information; a pre-configured input information or a request to run a software application. An advantage with this is that the processing circuitry 102a, 102b of the communication device 20a, 20b can prepare an operation based on the content of the parking response message.

According to an aspect the parking response message comprising information that no vehicle parking fee service provider 600a, 600b, 600c is available for receiving payment of the vehicle parking fee where the vehicle is parked. According to an aspect the parking response message comprising information relating to a plurality of vehicle parking fee service providers 600a, 600b, 600c that are available for receiving payment of the vehicle parking fee where the vehicle is parked.

Figure 2:
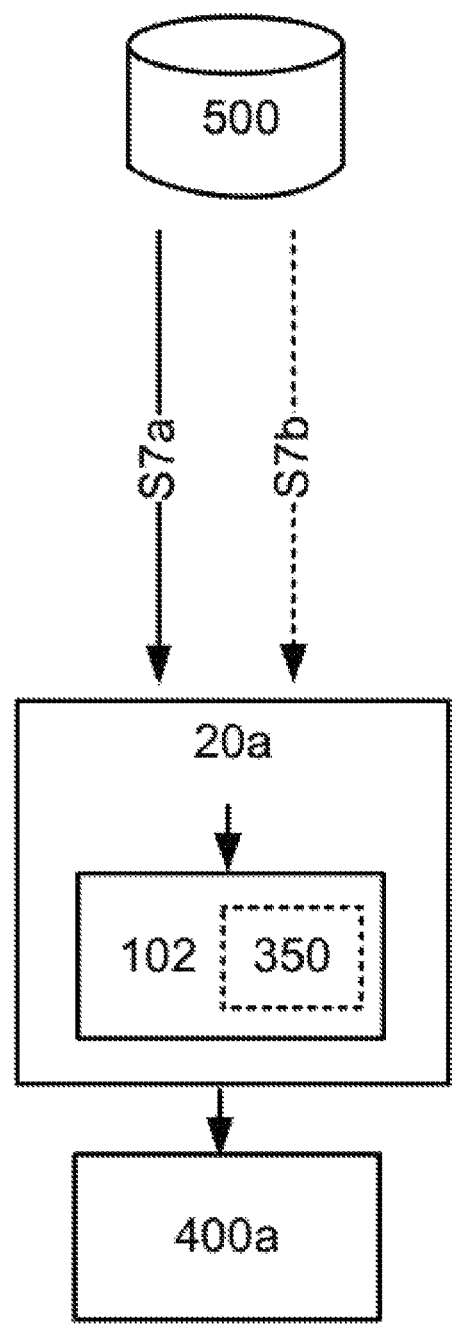
FIG. 2 illustrates an example of how to manage data associated with a least first vehicle parking fee service provider.

According to an aspect, as illustrated by the functional illustration of FIG. 2, the parking response message that is sent S7a to the to the communication device 20a comprising a plurality of data associated a plurality of vehicle parking fee service providers 600a, 600b, 600c. The information provided in the parking response message is received at the communication device 20a and the processing circuitry 102, illustrated in FIG. 2 as comprised in the communication device 20a, is processing the information according to a defined application programming interface 350 in order to present information in a uniform way via a defined graphical user interface of the user interface 400a. In other words according to an aspect an application programming interface 350 is defined in order to provide a defined graphical user interface configured to be presented to the user of the vehicle via the user interface 400a. An advantage with a defined graphical user interface is that the user experience for the user of the vehicle is the same independent of the vehicle parking fee service provider 600a, 600b, 600c that is offering the service of receiving payment of the vehicle parking fee where the vehicle is parked.

In other words, the user of the vehicle may be unaware of what vehicle parking fee service provider 600a, 600b, 600c that is offering the service, but instead only accepts that parking can be initiated and paid for where the vehicle is parked.

According to an aspect the vehicle parking management server 500 is connected to a payment server 800 as illustrated in FIG. 1, in order to manage payment of the vehicle parking fee. According to an aspect the user of the vehicle is associated with a user account an existing user account or vehicle account. According to an aspect the vehicle parking management server 500 is given approval form the user to manage payment of vehicle parking fees via the payment server 800. According to an aspect a user of vehicle parking management system 100 has authorized the vehicle parking management system 100 to manage payment of the vehicle parking fees. In one example any conventional payment methods such as credit card, customer account, prepayment or invoicing is facilitated by the vehicle parking management system 100 alone or via the payment server 800.

As illustrated in FIG. 3A the method is followed by the step S8a of displaying, via a user interface 400a, 400b of the communication device, selection information associated with the a least first vehicle parking fee service provider 600a, 600b, 600c available for receiving payment of the vehicle parking fee where the vehicle is parked. According to an aspect the selection information comprising at least one of a name, a parking fee, a parking start indication, a geographical area, a name of a location, an address, a name of a vehicle parking fee service provider 600a, 600b, 600c, a confirmation information or a decline/reject information that can be selected by a user.

The method is then followed by the step S9a of receiving selection input by a user, via the user interface 400a, 400b of the communication device, wherein the selection input selecting the at least first vehicle parking fee service provider 600a, 600b, 600c available for receiving payment of the vehicle parking fee where the vehicle is parked. According to an aspect the selection input by the user is triggering the selection of the at least first vehicle parking fee service provider 600a, 600b, 600c available for receiving payment of the vehicle parking fee where the vehicle is parked. In other words, depending on the selection by the user, at least first vehicle parking fee service provider 600a, 600b, 600c is selected. In one example the selection input can be a "start button" on a touch sensitive display. In one example the selection input can be a "parking fee button" on a touch sensitive display. In other words, the user is not necessarily informed about what particular vehicle parking fee service provider 600a, 600b, 600c that is offering the service for receiving payment of the vehicle parking fee where the vehicle is parked. In one example the vehicle manufacturing company is offering a vehicle parking management system 100 according to the disclosure, and collaborates with vehicle parking fee service providers 600*a*, 600*b*, 600*c* Worldwide in order to provide the user of the vehicle the possibility to park at any location where a partner vehicle parking fee service provider 600*a*, 600*b*, 600*c* is offering the service for receiving payment of the vehicle parking fee where the vehicle is parked.

An advantage with the method is that a user of the vehicle automatically gets information about how payment for the parking, where the vehicle has been parked, can be initiated without need for using any certain parking payment application, and by a user selection, the parking is initiated using one of plural vehicle parking fee service providers 600*a*, 600*b*, 600*c* that is available for receiving payment of the vehicle parking fee where the vehicle is parked.

Now referring to FIG. 3A, according to an aspect, the method further comprising the step S7*b* of sending a parking response message to the communication device 20*a*, 20*b* comprising data associated with a first vehicle parking fee service provider 600*a* and a second vehicle parking fee service provider 600*b*. The method is then followed by the step S8*b* of displaying, via a user interface 400*a*, 400*b* of the communication device, selection information associated with the first vehicle parking fee service provider and selection information associated with the second vehicle parking fee service provider available for receiving payment of the vehicle parking fee where the vehicle is parked.

As illustrated in FIG. 3B, then the method is followed by the step S9*b* of receiving selection input by a user, via the user interface 400*a*, 400*b* of the communication device, wherein the selection input selecting one of the first vehicle parking fee service provider or the second vehicle parking fee service provider available for receiving payment of the vehicle parking fee where the vehicle is parked. An advantage with the method is that a user of the vehicle automatically gets information about how payment for the parking, where the vehicle has been parked, can be initiated without need for using any certain parking payment application, and by a user selection, that is selecting one of two available options, the parking is initiated using one of plural vehicle parking fee service providers 600*a*, 600*b*, 600*c* that is available for receiving payment of the vehicle parking fee where the vehicle is parked. According to an aspect the selection input is a selection of a parking fee associated a vehicle parking fee service provider.

According to an aspect, the method further comprising the step S10 of displaying, via a user interface 400*a*, 400*b* of the communication device, instructions to the user how to make payment of the vehicle parking fee to the selected vehicle parking fee service provider. An advantage is that the user may be able to control how payment of the vehicle parking fee is carried out, e.g. if plural options exists or if a new payment method needs to be added etc.

According to an aspect the parking request message further comprising identification data comprising any of an identification data of the vehicle 5 or an identification data of the user 1 of the vehicle. An advantage with this is that the vehicle parking fee service providers 600*a*, 600*b*, 600*c* can at an early stage know if the user or vehicle is a known user of vehicle e.g. associated with an existing user account or vehicle account.

According to an aspect the communication device 20*a*, 20*b* is a communication device installed in the vehicle 20*a* and/or a communication device associated with the user 1 of the vehicle 20*b*. In other words the communication device 20*a*, 20*b* has a connection to the vehicle, either direct or via a user of the vehicle.

In the below use case, an example of the described method and aspects of the method will be described. A user of a vehicle is going on vacation to a city in another country. After parking the vehicle at the destination, the vehicle senses that the vehicle is parked and in communication with the vehicle parking management server 500 the user interface 400*a* of the infotainment system of the vehicle automatically displays selection information for paying the parking fee at the parking space where the vehicle is parked. The selection information displayed is "Start 2 EUR per hour" or "Start 40 EUR per 24h". The user selects the "Start 30 EUR per 24h" since this is the cheapest alternative and the user intends to stay several days. The parking is started and the user can leave the vehicle without any hassle. What the user does not know, and don't need to know is that the alternative "Start 30 EUR per 24h" is offered by a first vehicle parking fee service provider 600*a* and the "Start 2 EUR per hour" is offered by a second vehicle parking fee service provider 600*b*. Payment is managed by the vehicle parking management server 500 that is administrated by the vehicle manufacturer.

The disclosure further proposes a computer program product comprising a non-transitory computer readable medium, having thereon a computer program comprising program instructions, the computer program being loadable into a processing circuitry 102*a*, 102*b*, 102*c* and configured to cause execution of the method according to any of claims 1 through 10 when the computer program is run by the processing circuitry 102*a*, 102*b*, 102*c*.

The different aspects of the disclosure can be combined with one or more of the other different aspects. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method for simplifying payment of a vehicle parking fee for a user, the method comprising:

detecting, by a sensor, that a vehicle is parked;

initiating, in response to the sensor detecting that the vehicle is parked, a process for payment of the vehicle parking fee comprising:

determining a geographical vehicle position data of the parked vehicle;

generating a parking request message to a vehicle parking management server wherein the parking request message comprising the geographical vehicle position data of the parked vehicle;

sending the parking request message to the vehicle parking management server from a communication device;

receiving the parking request message at the vehicle parking management server;

determining, by the vehicle parking management server, based on the geographical vehicle position data of the parked vehicle comprised in the received parking request message, at least a first vehicle parking fee service provider among plural available vehicle parking fee service providers that is available for receiving payment of the vehicle parking fee at a location corresponding to the geographical vehicle position data of the parked vehicle, the determining of the at least first vehicle parking fee service provider that is available for receiving payment of the vehicle parking fee comprising matching the geographical vehicle position data to geographical coverage data received from each of the vehicle parking fee service providers, wherein the geographical coverage data indicates areas of geographical coverage where the respective vehicle parking fee service provider is available to receive payment of the vehicle parking fee;

sending a parking response message, from the vehicle parking management server to the communication device, comprising data associated with a first vehicle parking fee service provider and a second vehicle parking fee service provider, the parking response message is in a predefined application program interface for uniform presentation of information in a user interface of the communication device;

displaying, via the user interface of the communication device, selection information associated with the first vehicle parking fee service provider and selection information associated with the second vehicle parking fee service provider available for receiving payment of the vehicle parking fee where the vehicle is parked; and receiving selection input by a user, via the user interface of the communication device, wherein the selection input is indicative of selecting one of the first vehicle parking fee service provider or the second vehicle parking fee service provider available for receiving payment of the vehicle parking fee at the location corresponding to the geographical vehicle position data of the parked vehicle where the vehicle is parked.

2. The method according to claim 1 comprising:
displaying, via a user interface of the communication device, instructions to the user how to make payment of the vehicle parking fee to the selected vehicle parking fee service provider.

3. The method according to claim 1, wherein the sensor is a gearbox indicator sensor for sensing if a gear shift lever is in parking position.

4. The method according to claim 1, wherein the sensor is a parking sensor for sensing if the vehicle is in a parking space.

5. The method according to claim 1, wherein the sensor is a global positioning system receiver for sensing if the vehicle is going from a driving state to a non-movement state.

6. The method according to claim 1, wherein the determining, by the vehicle parking management server, of at least the first vehicle parking fee service provider further comprises sending, from the vehicle parking management server to plural vehicle parking fee service providers, an availability request message comprising the geographical vehicle position data; and receiving, at the vehicle parking management server from plural vehicle parking fee service providers, an availability response message indicating the availability of receiving payment of the vehicle parking fee where the vehicle is parked.

7. The method according to claim 1, wherein the parking request message further comprising identification data comprising any of an identification data of the vehicle or an identification data of the user of the vehicle.

8. The method according to claim 1, wherein the communication device is a communication device installed in the vehicle and/or a communication device associated with the user of the vehicle.

9. The method according to claim 1, wherein the parking response message to the communication device comprises data that is any of a web address; a pointer to a software application; a login information; a pre-configured input information or a request to run a software application.

10. The method according to claim 1, further comprising authorizing the vehicle parking management server to manage payment of vehicle parking fees.

11. The method according to claim 1, further comprising defining, in an application programming interface, communication between first and second vehicle parking fee service providers and the vehicle parking management server.

12. The method according to claim 1, further comprising hosting and managing the vehicle parking management server by a vehicle manufacturer.

13. A vehicle parking management system for simplifying payment of a vehicle parking fee for a user, the system comprising:
a vehicle parking management server;
a sensor for sensing that a vehicle is parked;
a communication device for communicating with the vehicle parking management server;
a processing circuitry configured to cause the vehicle parking management system to:
detect, by a sensor, that a vehicle is parked;
initiate, in response to the sensor detecting that the vehicle is parked, paying the vehicle parking fee comprising:
determining a geographical vehicle position data of the parked vehicle;
generating a parking request message to a vehicle parking management server wherein the parking request message comprising the geographical vehicle position data of the parked vehicle;
sending the parking request message to the vehicle parking management server from a communication device;
receiving the parking request message at the vehicle parking management server;
determining, by the vehicle parking management server, based on the geographical vehicle position data of the parked vehicle comprised in the received parking request message, at least a first vehicle parking fee service provider among plural available vehicle parking fee service providers that is available for receiving payment of the vehicle parking fee at a location corresponding to the geographical vehicle position data of the parked vehicle, the determination of the at least first vehicle parking fee service provider available for receiving payment of the vehicle parking fee comprises matching the geographical vehicle position data to geographical coverage data received from each of the vehicle parking fee service providers, wherein the geographical coverage data indicates areas of geographical coverage where the respective vehicle parking fee service provider is available to receive payment of the vehicle parking fee;
sending a parking response message, from the vehicle parking management server to the communication device, comprising data associated with a first vehicle parking fee service provider and a second vehicle parking fee service provider, wherein the parking response message is in a predefined application program interface for uniform presentation of information in a user interface of the communication device;

displaying, via the user interface of the communication device, selection information associated with the first vehicle parking fee service provider and selection information associated with the second vehicle parking fee service provider available for receiving payment of the vehicle parking fee where the vehicle is parked; and receiving selection input by a user, via the user interface of the communication device, wherein the selection input is indicative of selecting one of the first vehicle parking fee service provider or the second vehicle parking fee service provider available for receiving payment of the vehicle parking fee at the location corresponding to the geographical vehicle position data of the parked vehicle where the vehicle is parked.

14. The vehicle parking management system according to claim 13, wherein the sensor is a gearbox indicator sensor for sensing if a gear shift lever is in parking position.

15. The vehicle parking management system according to claim 13, wherein the sensor is a parking sensor for sensing if the vehicle is in a parking space.

16. The vehicle parking management system according to claim 13, wherein the sensor is a global positioning system receiver for sensing if the vehicle is going from a driving state to a non-movement state.

17. The vehicle parking management system according to claim 13, wherein at least one of the first and second vehicle parking fee service providers manages data regarding parking space information.

18. The vehicle parking management system according to claim 13, wherein the vehicle parking management server is hosted and managed by a vehicle manufacturer.

19. The vehicle parking management system according to claim 13, wherein the vehicle parking management server is authorized to manage payment of vehicle parking fees.

20. The vehicle parking management system according to claim 13, wherein the user interface comprises a defined graphical user interface.

* * * * *